(12) United States Patent
Nishimura et al.

(10) Patent No.: US 11,190,027 B2
(45) Date of Patent: Nov. 30, 2021

(54) VEHICLE, POWER TRANSMISSION METHOD, AND PROGRAM

(71) Applicant: TOYOTA JIDOSHA KABUSHIKI KAISHA, Toyota (JP)

(72) Inventors: Kazuya Nishimura, Okazaki (JP); Yoshihiro Oe, Kawasaki (JP); Naoki Uenoyama, Nisshin (JP); Hirofumi Kamimaru, Fukuoka (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 73 days.

(21) Appl. No.: 16/774,553

(22) Filed: Jan. 28, 2020

(65) Prior Publication Data
US 2020/0266635 A1 Aug. 20, 2020

(30) Foreign Application Priority Data
Feb. 20, 2019 (JP) .............................. JP2019-028496

(51) Int. Cl.
*H02J 7/00* (2006.01)
*B60L 58/14* (2019.01)
*B60L 53/00* (2019.01)
*B60L 50/60* (2019.01)
*H02J 7/34* (2006.01)

(52) U.S. Cl.
CPC ............ *H02J 7/0013* (2013.01); *B60L 50/60* (2019.02); *B60L 53/00* (2019.02); *B60L 58/14* (2019.02); *H02J 7/342* (2020.01); *Y02T 90/12* (2013.01); *Y02T 90/14* (2013.01)

(58) Field of Classification Search
CPC ......... H02J 7/0013; H02J 7/342; B60L 58/14; B60L 53/00; B60L 50/60; Y02T 90/12; Y02T 90/14
USPC .............................................. 320/109; 701/22
See application file for complete search history.

(56) References Cited

U.S. PATENT DOCUMENTS

2012/0299373 A1* 11/2012 Yoshida .................. H02J 7/025
 307/9.1
2012/0316714 A1* 12/2012 Nagayanagi ............ B60L 58/12
 701/22

FOREIGN PATENT DOCUMENTS

JP 2017-196975 A 11/2017

* cited by examiner

*Primary Examiner* — Zixuan Zhou
(74) *Attorney, Agent, or Firm* — Oliff PLC

(57) ABSTRACT

A vehicle capable of transmitting power to another vehicle includes an acquisition section that acquires a distance from a location of the vehicle to a specified point; a comparison section that compares the distance with a cruising range of the vehicle; and a control section that controls the power transmission to the other vehicle according to a comparison result.

8 Claims, 6 Drawing Sheets

VEHICLE, POWER TRANSMISSION METHOD, AND PROGRAM

INCORPORATION BY REFERENCE

The disclosure of Japanese Patent Application No. 2019-028496 filed on Feb. 20, 2019 including the specification, drawings and abstract is incorporated herein by reference in its entirety.

BACKGROUND

1. Technical Field

The present disclosure relates to a vehicle, a power transmission method, and a program.

2. Description of Related Art

There are ongoing problems of shortage of chargers and long-time use of the chargers at a shopping mall and the like. If a battery runs out at a place where an electric vehicle cannot be charged, it is necessary to call a tow truck or the like. Thus, an owner of the electric vehicle does not have any other option than to charge the electric vehicle after waiting a long time.

To handle such a problem, a technique of transmitting power between vehicles has been examined (for example, Japanese Patent Application Publication No. 2017-196975 (JP 2017-196975 A)).

SUMMARY

However, in the case where the technique disclosed in JP 2017-196975 A, the vehicle as a power transmission source possibly becomes short of fuel.

The present disclosure has been made in view of the above point and therefore has a purpose of allowing power exchange between vehicles while avoiding fuel shortage of the vehicle of a power transmission side.

A vehicle according to an aspect of the disclosure is a vehicle capable of transmitting power to another vehicle and includes: an acquisition section that acquires a distance from a location of the vehicle to a specified point; a comparison section that compares the distance with a cruising range of the vehicle; and a control section that controls the power transmission to the other vehicle according to a comparison result.

In this way, the power is transmitted according to whether the vehicle on the power transmission side can reach the specified point.

Thus, it is possible to allow power exchange between the vehicles while avoiding shortage of fuel of the vehicle on the power transmission side.

In the vehicle in the aspect of the disclosure, the control section controls the power transmission on the basis of the comparison result and whether the vehicle is currently charged or currently generates the power.

In this way, the power is transmitted according to whether the vehicle on the power transmission side is currently charged or currently generates the power.

Thus, it is possible to allow power exchange between the vehicles while avoiding shortage of fuel of the vehicle on the power transmission side.

A power transmission method in another aspect of the disclosure executes: an acquisition procedure in which a vehicle capable of transmitting power to another vehicle acquires a distance from a location of the vehicle to a specified point; a comparison procedure to compare the distance with a cruising range of the vehicle; and a control procedure to control the power transmission to the other vehicle according to a comparison result.

In this way, the power is transmitted according to whether the vehicle on the power transmission side can reach the specified point.

Thus, it is possible to allow power exchange between the vehicles while avoiding shortage of fuel of the vehicle on the power transmission side.

A program in further another aspect of the disclosure makes a vehicle capable of transmitting power to another vehicle execute: an acquisition procedure to acquire a distance from a location of the vehicle to a specified point; a comparison procedure to compare the distance with a cruising range of the vehicle; and a control procedure to control the power transmission to the other vehicle according to a comparison result.

In this way, the power is transmitted according to whether the vehicle on the power transmission side can reach the specified point.

Thus, it is possible to allow the power exchange between the vehicles while avoiding the shortage of the fuel of the vehicle on the power transmission side.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Figure 1:
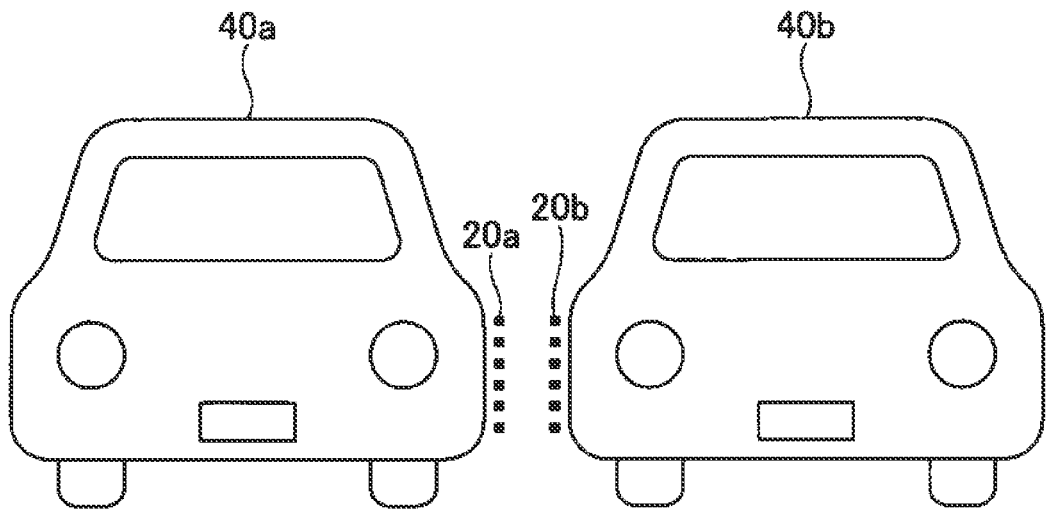
FIG. 1 is a view for explaining vehicles 40 in a first embodiment.

A description will hereinafter be made on embodiments of the disclosure with reference to the drawings. FIG. 1 is a view for explaining vehicles 40 in a first embodiment. FIG. 1 illustrates a vehicle 40a and a vehicle 40b (may simply be referred to as the "vehicles 40" unless being distinguished from each other). The vehicle 40 is an automobile that is driven by an engine, a motor, or the like, for example.

In FIG. 1, the vehicle 40a is the vehicle 40 that can transmit power possessed by the own vehicle to the other vehicle 40, and includes a power transmission device 20a. The power transmission device 20a is a device that transmits the power of the host vehicle to the other vehicle 40. The vehicle 40b is the vehicle 40 that can receive the power of the other vehicle 40, and includes a power reception device 20b. The power reception device 20b is a device that receives the power of the other vehicle 40 and stores such power in a storage cell of the host vehicle.

Here, the power transmission device 20a and the power reception device 20b may each include an antenna or the like that can transmit or receive the power in a non-contact state, or may be able to receive or transmit the power in a contact state (for example, a state of being connected to a cable or the like), respectively.

Figure 2:
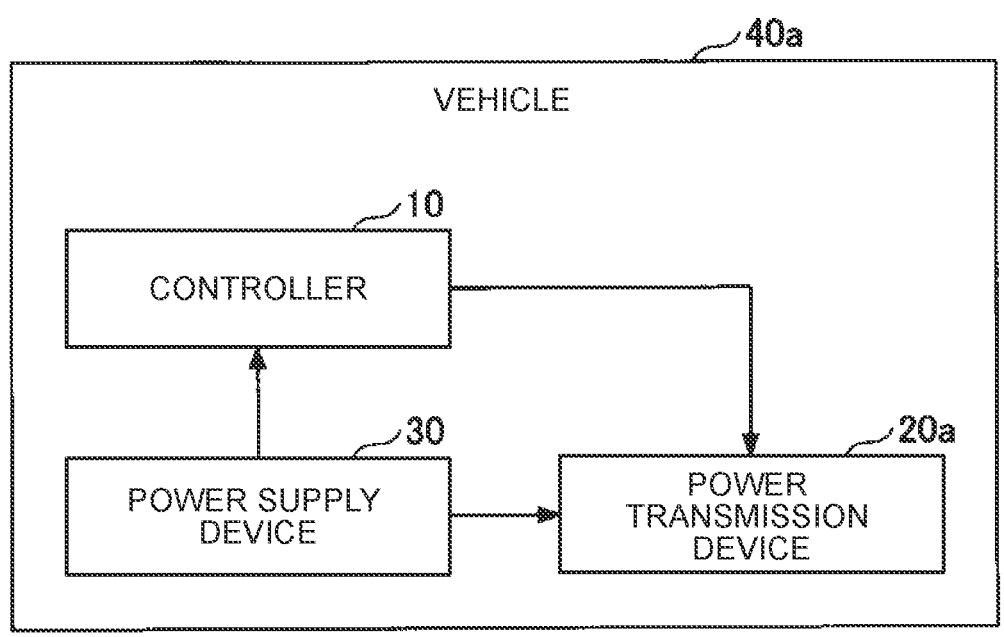
FIG. 2 is a diagram illustrating a hardware configuration example of a vehicle 40a in the first embodiment.

FIG. 2 is a diagram illustrating a hardware configuration example of the vehicle 40a in the first embodiment. In FIG. 2, the vehicle 40a includes a power supply device 30, a controller 10, the power transmission device 20a, and the like. The power supply device 30 is a device that functions as a power source. For example, in the case where the vehicle 40a is an engine vehicle or a hybrid vehicle, a generator such as the engine may be the power supply device 30. Meanwhile, in the case where the vehicle 40a is an electric vehicle or the hybrid vehicle, the storage cell (a battery) may be the power supply device 30.

The controller 10 is a computer that determines whether to transmit the power, executes control of the power transmission device 20a, and the like. That is, the power transmission device 20a transmits the power in response to a command from the controller 10.

Figure 3:
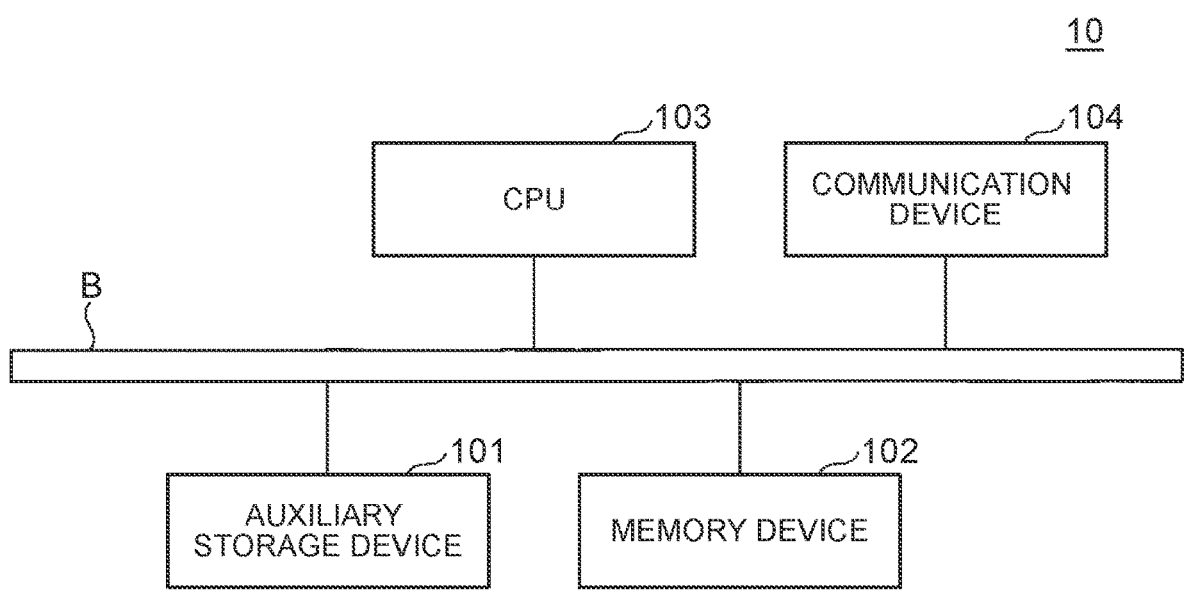
FIG. 3 is a diagram illustrating a hardware configuration example of a controller 10 in the first embodiment.

FIG. 3 is a diagram illustrating a hardware configuration example of the controller 10 in the first embodiment. The controller 10 in FIG. 3 includes an auxiliary storage device 101, a memory device 102, a CPU 103, a communication device 104, and the like that are mutually connected by a bus B.

A program that realizes processing in the controller 10 is installed in the auxiliary storage device 101. The auxiliary storage device 101 stores the installed program and stores necessary files, data, and the like.

When a program activation command is issued, the memory device 102 loads and stores the program from the auxiliary storage device 101. The CPU 103 executes a function related to the controller 10 according to the program stored in the memory device 102. The communication device 104 executes wireless communication via a mobile communication network, near-field wireless communication, a wireless local area network (LAN), or the like.

Figure 4:
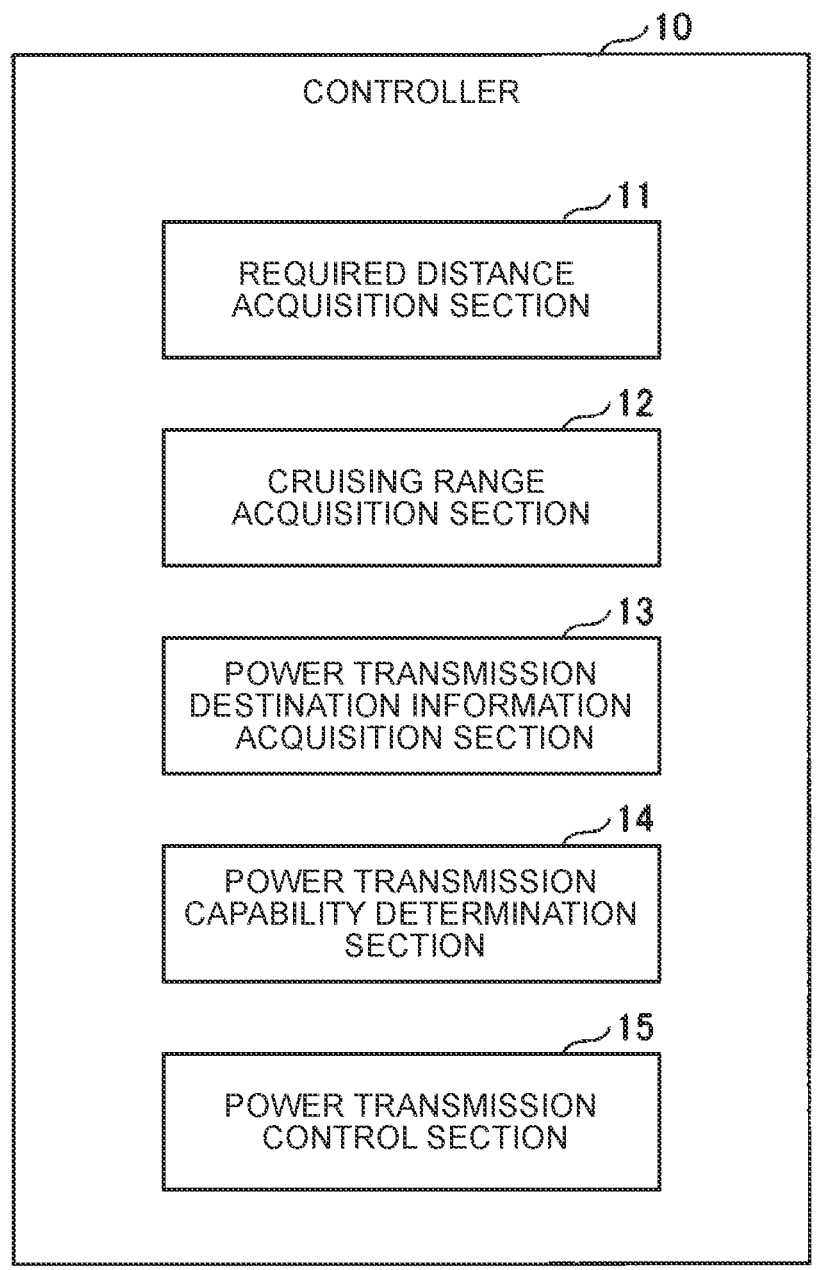
FIG. 4 is a diagram illustrating a functional configuration example of the controller 10 in the first embodiment.

FIG. 4 is a diagram illustrating a functional configuration example of the controller 10 in the first embodiment. In FIG. 4, the controller 10 includes a required distance acquisition section 11, a cruising range acquisition section 12, a power transmission destination information acquisition section 13, a power transmission capability determination section 14, a power transmission control section 15, and the like. Each of these sections is realized by processing that is executed when the CPU 103 executes one or more programs installed in the controller 10.

The required distance acquisition section 11 acquires a distance from a current location (a location) of the vehicle 40a to a nearest gas station, a charging spot, or the like (hereinafter referred to as a "filling base") for the vehicle 40a. The distance means a threshold of a required travel distance for the vehicle 40a after the vehicle 40a transmits the power to the vehicle 40b.

The cruising range acquisition section 12 acquires a cruising range of the vehicle 40a.

The power transmission destination information acquisition section 13 acquires information on the vehicle 40b as a power transmission destination.

The power transmission capability determination section 14 determines whether to transmit the power to the vehicle 40b on the basis of a comparison result between the distance acquired by the required distance acquisition section 11 and the cruising range of the vehicle 40a, whether the vehicle 40a is currently charged or currently generates the power, and the like.

The power transmission control section 15 controls the power transmission to the vehicle 40b according to a determination result by the power transmission capability determination section 14.

Figure 5:
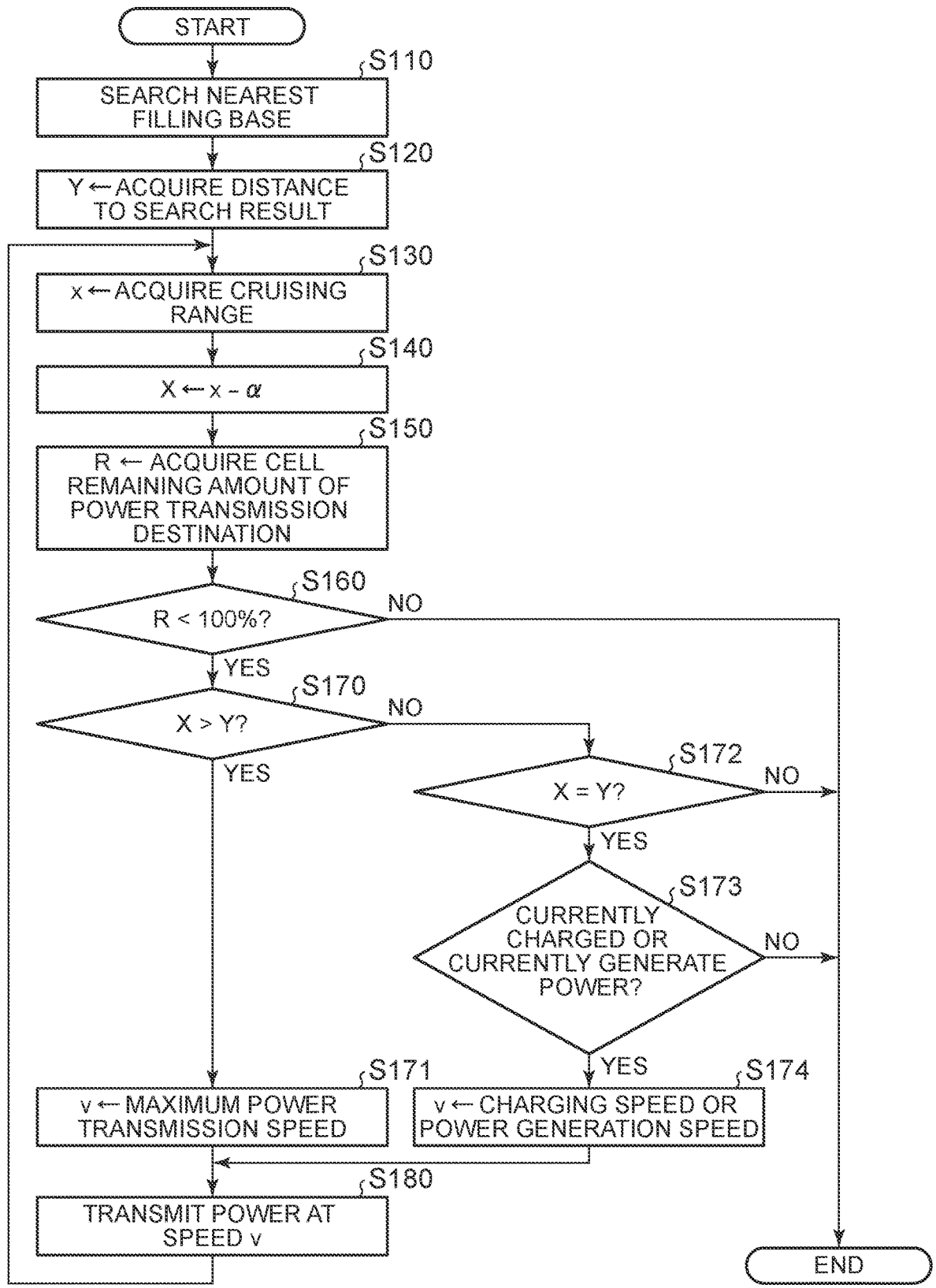
FIG. 5 is a flowchart for illustrating an example of a processing procedure that is executed by the controller 10 in the first embodiment.

A description will hereinafter be made on a processing procedure that is executed by the controller 10. FIG. 5 is a flowchart for illustrating an example of the processing procedure that is executed by the controller 10 in the first embodiment. After a positional relationship between the vehicle 40a and the vehicle 40b is adjusted so that the vehicle 40a can transmit power to the vehicle 40b, the controller 10 in the vehicle 40a executes the processing procedure in FIG. 5 in response to input of the power transmission command for the vehicle 40a, for example.

In step S110, the required distance acquisition section 11 uses a navigation system, the Internet, or the like of the vehicle 40a, for example, to search the nearest filling base. Here, in the case where the vehicle 40a is the gasoline vehicle, the hybrid vehicle, or the like that can use gasoline as the fuel, it is only required to search the nearest gas station. Meanwhile, in the case where the vehicle 40a uses the power as the fuel like the electric vehicle, it is only required to search the nearest charging spot.

Next, the required distance acquisition section 11 uses the navigation system, the Internet, or the like of the vehicle 40a to acquire the distance from the current location (the location) of the vehicle 40a to the nearest filling base and substitutes the distance for a variable Y (S120). The distance is not a straight distance between the two points but a distance of a route between the two points. For example, the distance of the route with the shortest distance may be substituted for Y, or the distance of the route with the shortest required duration may be substituted for Y.

Next, the cruising range acquisition section 12 acquires the cruising range of the vehicle 40a and substitutes the cruising range for a variable x (S130). The cruising range may be calculated from a remaining amount of the fuel, average fuel economy, and the like, for example. Next, the cruising range acquisition section 12 substitutes a result that is obtained by subtracting α margin a from the variable x for a variable X (S140). A reason for subtracting a here will be described later.

Next, the power transmission destination information acquisition section 13 acquires a cell remaining amount (%) of the vehicle 40b and substitutes the cell remaining amount for a variable R (S150). The cell remaining amount may be acquired by the communication with the vehicle 40b using the communication device 104, or may be acquired by the communication between the power transmission device 20a of the vehicle 40a and the power reception device 20b of the vehicle 40b.

Next, the power transmission capability determination section 14 determines whether R is lower than 100% (S160). If R is 100% (NO in S160), the power transmission is unnecessary. Thus, the power transmission capability determination section 14 terminates the processing. As a result, the power transmission is stopped in the case where the power is transmitted. On the other hand, if R is lower than 100% (YES in S160), the power transmission capability determination section 14 compares X and Y (S170). That is, it is determined whether a fuel remaining amount of the vehicle 40a is larger than an amount that is required for the vehicle 40a to reach the nearest filling base.

If the comparison result indicates that X is larger than Y (YES in S170), the power transmission control section 15 sets a maximum value (an ampere (A)) of a speed, at which the power transmission device 20a can transmit the power, to a power transmission speed v (S171), and controls the power transmission device 20a to transmit the power at the power transmission speed v (S180). After the power is transmitted for specified duration, the processing in step S130 onward is repeated. Note that a in step S140 is a margin that prevents x from becoming smaller than Y in the specified duration. In addition, a is also a margin that allows the vehicle 40a to reach the nearest filling base even in the case where the vehicle 40a slightly deviates from the route used for the calculation of Y, which is calculated to make the vehicle 40a reach such a filling base. A value of a only needs to be calculated in consideration of these purposes.

On the other hand, if the comparison result indicates that X is equal to or smaller than Y (NO in S170), the power transmission capability determination section 14 determines whether X=Y (S172). If X=Y (YES in S172), the power transmission capability determination section 14 determines whether the vehicle 40a is currently charged or the vehicle 40a currently generates the power (S173). In the case where the vehicle 40a is the electric vehicle, it is determined whether the vehicle 40a is currently charged. In the case where the vehicle 40a includes the engine, it is only necessary to determine whether the engine is currently actuated. If the vehicle 40a is currently charged or currently generates the power (YES in S173), the power transmission control section 15 sets a charging speed or a power generating speed to the power transmission speed v (S174), and executes the processing in step S180. That is, if X=Y, the power is transmitted to the vehicle 40b at the same speed as a power supply speed to the vehicle 40a.

If X is smaller than Y (NO in S172), or if the vehicle 40a is not currently charged or does not currently generate the power (NO in S173), the power transmission capability determination section 14 terminates the processing. As a result, the power transmission is stopped in the case where the power is transmitted. In this way, it is possible to avoid loss of the fuel that is required for the vehicle 40a to reach the nearest filling base.

As described above, according to the first embodiment, the power is transmitted according to whether the vehicle 40a on the power transmission side can reach the nearest filling base. Thus, the first embodiment is implemented for a purpose of allowing the power exchange between the vehicles 40 while avoiding shortage of the fuel of the vehicle 40 on the power transmission side.

Note that population of the nearest filling bases may be limited to the filling bases on the route to a next destination of the vehicle 40a. In addition, in the case where the vehicle 40a can be charged at home like the electric vehicle, the home may be included in a search range.

Next, a description will be made on a second embodiment. In the second embodiment, a description will be made on a different point from the first embodiment. Thus, the points that will not particularly mentioned may be the same as those in the first embodiment.

Figure 6:
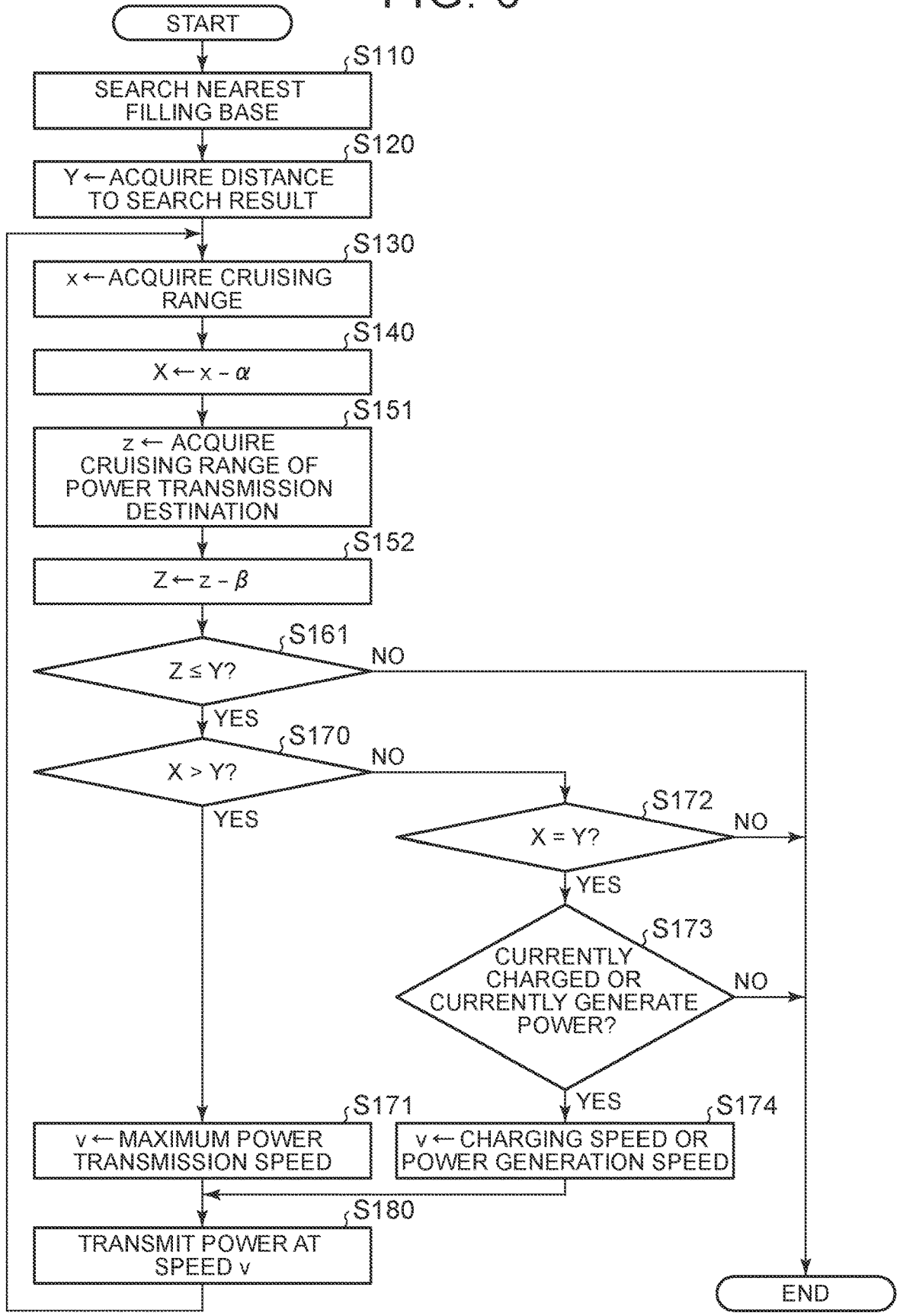
FIG. 6 is a flowchart for illustrating an example of a processing procedure that is executed by the controller 10 in a second embodiment.

FIG. 6 is a flowchart for illustrating an example of a processing procedure that is executed by the controller 10 in the second embodiment. In FIG. 6, the same steps as those in FIG. 5 will be denoted by the same step numbers, and the description thereon will not be made. In FIG. 6, instead of step S150 in FIG. 5, steps S151 and S152 are executed. In addition, instead of step S160 in FIG. 5, step S161 is executed.

In step S151, the cruising range acquisition section 12 acquires the cruising range of the vehicle 40b and substitutes the cruising range for a variable z. A method for acquiring the cruising range may be the same as the method for acquiring the cell remaining amount in step S150 illustrated in FIG. 5. Next, the cruising range acquisition section 12 substitutes a result that is obtained by subtracting a margin β from the variable z for a variable Z (S152).

Next, the power transmission capability determination section 14 determines whether Z is equal to or lower than Y (S161). If Z is larger than Y (NO in S161), the power transmission capability determination section 14 terminates the processing. As a result, the power transmission is stopped in the case where the power is transmitted. If Z is equal or smaller than Y (YES in S161), the processing in step S170 onward is executed.

That is, in the second embodiment, such an amount of the power that allows the vehicle 40b to reach the nearest filling base is transmitted. The second embodiment is preferred at the time of rescue, for example, a case where the cell remaining amount of the vehicle 40b is insufficient, for example.

Note that β in step S152 is a margin that allows the vehicle 40b to reach the nearest filling base even in the case where the vehicle 40b slightly deviates from the route used for the calculation of Y, which is calculated to make the vehicle 40b reach such a filling base.

In addition, in the case where the vehicle 40a can use the gasoline, there is a possibility that the nearest filling base differs between the vehicle 40a and the vehicle 40b. In this case, the required distance acquisition section 11 searches the nearest filling bases for the vehicle 40a and the vehicle 40b and sets distances to the filling bases as Y1, Y2, respectively. In step S161, Y2 is used instead of Y. In steps S170 and S172, Y1 is used instead of Y.

Figure 7:
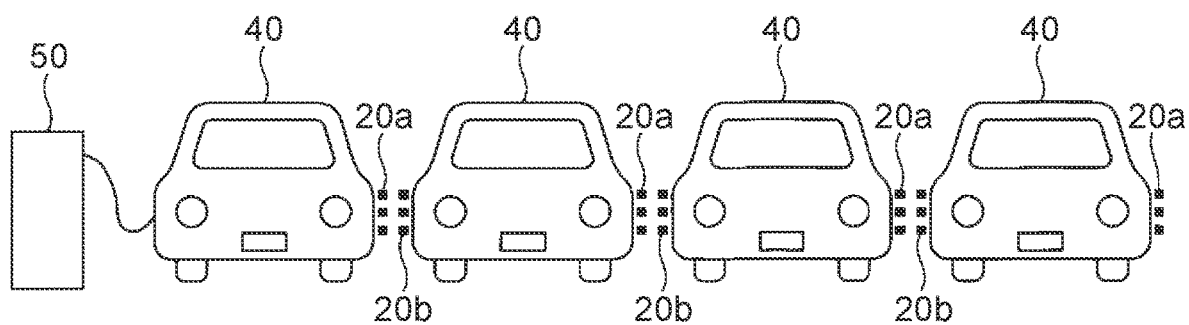
FIG. 7 is a view illustrating a state where the plural vehicles 40 are arranged side-by-side.

Each of the above embodiments may be applied to the case where the plural vehicles 40 are arranged side-by-side as illustrated in FIG. 7 and the power is transmitted from the vehicle 40 that is located near (on an upstream side of) a charger 50 to the vehicle 40 that is located away from (on a downstream side of) the charger 50.

In this embodiment, the required distance acquisition section 11 is an example of the acquisition section. The power transmission capability determination section 14 is an example of the comparison section. The power transmission control section 15 is an example of the control section. The filling base is an example of the specified point.

The detailed description has been made so far on the embodiments of the disclosure. The disclosure is not limited to such particular embodiments, and various modifications and changes can be made to thereto within the scope of the gist of the disclosure described in the claims.

What is claimed is:

1. A vehicle capable of transmitting power to a second vehicle, the vehicle comprising:
a computer having a hardware processor programmed to:
acquire a distance from a current location of the vehicle to a specified point;
perform a comparison that compares the distance that has been acquired with a cruising range of the vehicle; and
control the power transmission to the second vehicle according to a result of the comparison so that the vehicle has enough fuel remaining to travel from the current location to the specified point after completion of the power transmission to the second vehicle.

2. The vehicle according to claim 1, wherein
the hardware processor controls the power transmission based on the result of the comparison and a determination as to whether the vehicle is currently being charged or currently generates the power.

3. The vehicle according to claim 1, wherein
the specified point is a power supply base that is nearest to the vehicle along a route of the vehicle, and the distance acquired by the hardware processor is the distance between the current location of the vehicle and the power supply base that is nearest to the vehicle along the route of the vehicle.

4. The vehicle according to claim 1, wherein
the hardware processor controls a speed of the power transmission based on the result of the comparison between the distance that has been acquired and the cruising range of the vehicle.

5. A power transmission method executed by a hardware processor of a computer of a vehicle that is capable of transmitting power to a second vehicle, the method comprising:
executing, by the hardware processor, an acquisition procedure that acquires a distance from a current location of the vehicle to a specified point;
executing, by the hardware processor, a comparison procedure that compares the distance that has been acquired with a cruising range of the vehicle; and
executing, by the hardware processor, a control procedure that controls the power transmission to the second vehicle according to a result of the comparison so that the vehicle has enough fuel remaining to travel from the current location to the specified point after completion of the power transmission to the second vehicle.

6. The method according to claim 5, wherein
the specified point is a power supply base that is nearest to the vehicle along a route of the vehicle, and the distance acquired by the hardware processor in the acquisition procedure is the distance between the current location of the vehicle and the power supply base that is nearest to the vehicle along the route of the vehicle.

7. The method according to claim 5, wherein
the hardware processor, in the control procedure, controls a speed of the power transmission based on the result of the comparison between the distance that has been acquired and the cruising range of the vehicle.

8. A non-transitory computer-readable recording medium on which is stored a program; which, when executed by a hardware processor of a computer of a vehicle that is capable of transmitting power to a second vehicle, causes the hardware processor to perform:
an acquisition procedure that acquires a distance from a current location of the vehicle to a specified point;
a comparison procedure that compares the distance that has been acquired with a cruising range of the vehicle; and
a control procedure that controls the power transmission to the second vehicle according to a result of the comparison so that the vehicle has enough fuel remaining to travel from the current location to the specified point after completion of the power transmission to the second vehicle.

* * * * *